United States Patent
Mason, Jr. et al.

(10) Patent No.: US 6,888,876 B1
(45) Date of Patent: May 3, 2005

(54) FREQUENCY HOPPING SPREAD SPECTRUM COMMUNICATIONS SYSTEM

(75) Inventors: Robert T. Mason, Jr., Raleigh, NC (US); Eugene W. Hodges, IV, Holly Springs, NC (US); Rodney C. Hemminger, Raleigh, NC (US); Kenneth C. Shuey, Zebulon, NC (US)

(73) Assignee: Elster Electricity, LLC, Raleigh, NC (US)

(*) Notice: Subject to any disclaimer, the term of this patent is extended or adjusted under 35 U.S.C. 154(b) by 39 days.

(21) Appl. No.: 10/037,357

(22) Filed: Dec. 21, 2001

(51) Int. Cl.[7] .............................................. H04B 1/713
(52) U.S. Cl. ...................... 375/132; 375/267; 375/299
(58) Field of Search ................................ 375/130, 132, 375/133, 134, 135, 136, 137, 260, 267, 299, 348, 347; 370/310, 342, 345, 473, 498; 340/870.02

(56) References Cited

U.S. PATENT DOCUMENTS

| | | | | |
|---|---|---|---|---|
| 4,066,964 A | * | 1/1978 | Costanza et al. ............ 375/260 |
| 4,328,581 A | | 5/1982 | Harmon et al. .............. 714/708 |
| 5,018,165 A | | 5/1991 | Sohner et al. ............... 375/133 |
| 5,311,541 A | | 5/1994 | Sanderford, Jr. ............ 375/131 |
| 5,311,542 A | | 5/1994 | Eder .......................... 375/130 |
| 5,377,222 A | | 12/1994 | Sanderford, Jr. ............ 375/131 |
| 5,430,759 A | | 7/1995 | Yokev et al. ................ 375/133 |
| 5,438,329 A | | 8/1995 | Gastouniotis et al. .. 340/870.02 |
| 5,668,803 A | | 9/1997 | Tymes et al. ................ 370/312 |
| 5,668,828 A | | 9/1997 | Sanderford, Jr. et al. .... 375/136 |
| 5,884,184 A | | 3/1999 | Sheffer ....................... 455/521 |
| 5,892,758 A | | 4/1999 | Argyroudis .................. 370/335 |
| 5,944,842 A | * | 8/1999 | Propp et al. ................. 714/701 |
| 5,959,550 A | | 9/1999 | Giles ....................... 340/870.02 |
| 6,034,988 A | | 3/2000 | VanderMey et al. ........ 375/134 |
| 6,061,604 A | | 5/2000 | Russ et al. ..................... 700/90 |
| 6,128,276 A | * | 10/2000 | Agee .......................... 370/208 |
| 6,137,423 A | | 10/2000 | Glorioso et al. ......... 340/870.02 |
| 6,208,266 B1 | | 3/2001 | Lyons et al. ............ 340/870.02 |

OTHER PUBLICATIONS

*Brochure*: TRF6900 Single–Chip RF Transceiver, Texas Instruments, Copyright 2001.

* cited by examiner

*Primary Examiner*—Chieh M. Fan
(74) *Attorney, Agent, or Firm*—Woodcock Washburn LLP

(57) ABSTRACT

The present invention is directed to a frequency hopping spread spectrum transceiver. The transceiver includes a microcontroller; a transmitter having a voltage controlled oscillator, a direct digital synthesizer, and a power amplifier; and a receiver having an amplifier, a mixer, an IF amplifier, a demodulator, and a data slicer. When transmitting, the transmitter communicates a preamble over a predetermined number of preamble channels, and thereafter communicate groups of data bytes that each comprise a subset of the data message over a predetermined sequence of data channels. When receiving, the receiver investigates the predetermined number of preamble channels to search for the preamble, each of the predetermined number of preamble channels being associated with a predetermined number of data channels in each sequence of data channels. A number of bytes that comprises each group of data bytes is determined in accordance with a number of channels in the sequence of data channels and the predetermined number of times each byte of the data message is to be transmitted.

20 Claims, 2 Drawing Sheets

FIG. 2

Channel Redundancy Calculations

| | |
|---|---|
| Data bytes | 72 |
| Redundancy | 3 |
| Total Packet Size | 216 |

| | |
|---|---|
| Num Data Channels | 7 |
| Bytes per channel | 31 |

Seven Data Channels

| | 1 | 2 | 2 | 3 | 3 | 4 | 4 | 5 | 5 | 6 | 6 | 7 | 7 |
|---|---|---|---|---|---|---|---|---|---|---|---|---|---|
| Bytes, Part1 | 31 | 32 | 62 | 63 | 72 | 22 | 52 | 53 | 72 | 12 | 42 | 43 | 72 |
| Bytes, Part 2 | 1 | 1 | 16 | 1 | 21 | 1 | | 1 | 11 | 1 | 1 | 1 | 1 |

| | |
|---|---|
| Data bytes | 72 |
| Redundancy | 3 |
| Total Packet Size | 216 |

| | |
|---|---|
| Num Data Channels | 5 |
| Bytes per channel | 44 |

Five Data Channels

| | 1 | 2 | 2 | 3 | 3 | 4 | 4 | 5 | 5 |
|---|---|---|---|---|---|---|---|---|---|
| Bytes, Part1 | 44 | 45 | 72 | 17 | 60 | 61 | 72 | 33 | 72 |
| Bytes, Part 2 | 1 | 1 | 16 | | | 1 | 32 | 1 | 4 |

FREQUENCY HOPPING SPREAD SPECTRUM COMMUNICATIONS SYSTEM

FIELD OF THE INVENTION

The present invention relates generally to the field of communications. More particularly, the invention relates to a frequency hopping spread spectrum technique by which messages are communicated via a limited number of channels to optimize packet timing and signaling efficiency.

BACKGROUND OF THE INVENTION

The fixed radio communications may operate using wire line or radio technology. Wire line technologies include utilizing the utility distribution lines and/or telephone lines. Wireless technologies may utilize the 902–928 MHz range, which can operate without a FCC license through the use of frequency hopping spread spectrum (FHSS) transmission, which spreads the transmitted energy over the band. According to FCC Regulations, for frequency hopping systems operating in the 902–928 MHz band, total output is as follows: 1 watt for systems employing at least 50 hopping channels; and, 0.25 watts for systems employing less than 50 hopping channels, but at least 25 hopping channels. See, 47 U.S.C. § 15.247.

FHSS systems meet the FCC specification by communicating to remote communication devices in synchronization, both in time and frequency. Using this approach, all devices know when to hop to the next channel in the sequence and what the next sequence channel is. A known FHSS system utilizes a hop rate that is faster than the data rate to send multiple sets of randomly selected frequencies in each message to distribute the transmitted energy over the communication band. This distribution is one of the FCC requirements to operate in the ISM band.

A disadvantage of the above is that it requires all devices to include a real time clock, which adds to the cost of the device. In addition, some type of battery storage system is required to maintain the real time clock in the event power should be removed from the device. Further, the requirement to step rapidly through the frequencies constrains the design of such devices and further limits cost reduction.

Another disadvantage of conventional FHSS systems is that they lack provisions to enhance data reliability. For example, U.S. Pat. No. 5,311,542, to Eder, discloses a spread spectrum communication system wherein segments of a message are broken into 20-bit segments. Each of the segments are transmitted over a different carrier signal within a frequency range of 902 to 928 MHz. However, the Eder system fails to teach a method to prevent lost segments or enhance data reliability should one or more of the segments not be received or carrier signals be blocked.

U.S. Pat. No. 5,311,541, to Sanderford, Jr., discloses another spread spectrum communications system. Sanderford, Jr. teaches a system whereby preamble information and message-data are sent via a psuedo-randomly selected single carrier frequency. Should the message not be received, another carrier frequency is selected and the entire message is retransmitted. While this provides a higher probability of a receiver receiving a complete message, the Sanderford, Jr. system must first sweep the spectrum to determine which channels are free of interference. After sweeping the spectrum, the receiver updates status information located in memory associated with each channel. Each of the receivers and transmitters communicate and store this data to prevent transmission on channels that are jammed or have interference. This disadvantageously increases the cost and complexity of the receiver, and requires the receivers/transmitters to periodically communicate this channel status data in order to maintain a higher level of reliability.

Therefore, there is a need for a FHSS communication device that is cost efficient, meets FCC requirements for power distribution in the ISM band, and includes provisions for data integrity. The present invention is directed to these, as well as other, needs in the art.

SUMMARY OF THE INVENTION

The present invention addresses the needs identified above in that it provides for a novel method and apparatus that utilizes frequency hopping spread spectrum communications. In accordance with a method of the present invention, a data message is communicated via a transceiver using spread spectrum communications, each byte of the data message being communicated a predetermined number of times over a sequence of data channels by a transmitter. The method includes transmitting a preamble over a predetermined number of preamble channels; and transmitting groups of data bytes that each comprise a subset of the data message over the predetermined sequence of data channels.

In accordance with the present invention, a number of bytes that comprises each group of data bytes is determined in accordance with a number of channels in the sequence of data channels and the predetermined number of times each byte of the data messages is to be transmitted.

In accordance with an apparatus of the present invention, there is provided a transceiver for use in a frequency hopping spread spectrum communication system, that incorporates a microcontroller, a transmitter including a voltage controlled oscillator, a direct digital synthesizer, and a power amplifier, and a receiver including an amplifier, a mixer, an IF amplifier, a demodulator, and a data slicer.

In accordance with an aspect of the invention, when the transceiver is transmitting, the transmitter communicates a preamble over a predetermined number of preamble channels, and thereafter communicate groups of data bytes that each comprise a subset of the data message over a predetermined sequence of data channels.

In accordance with another aspect of the present invention, when the transceiver is receiving, the receiver investigates the predetermined number of preamble channels to search for the preamble, each of the predetermined number of preamble channels being associated with a predetermined number of data channels in each sequence of data channels.

These and other aspects of the present invention will be described in the following detailed description of the invention.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings:

FIG. 2 illustrates exemplary groupings of data bytes of data message transmissions having data redundancy transmitted over seven and five data channels.

DETAILED DESCRIPTION OF THE PREFERRED EMBODIMENTS

Figure 1:
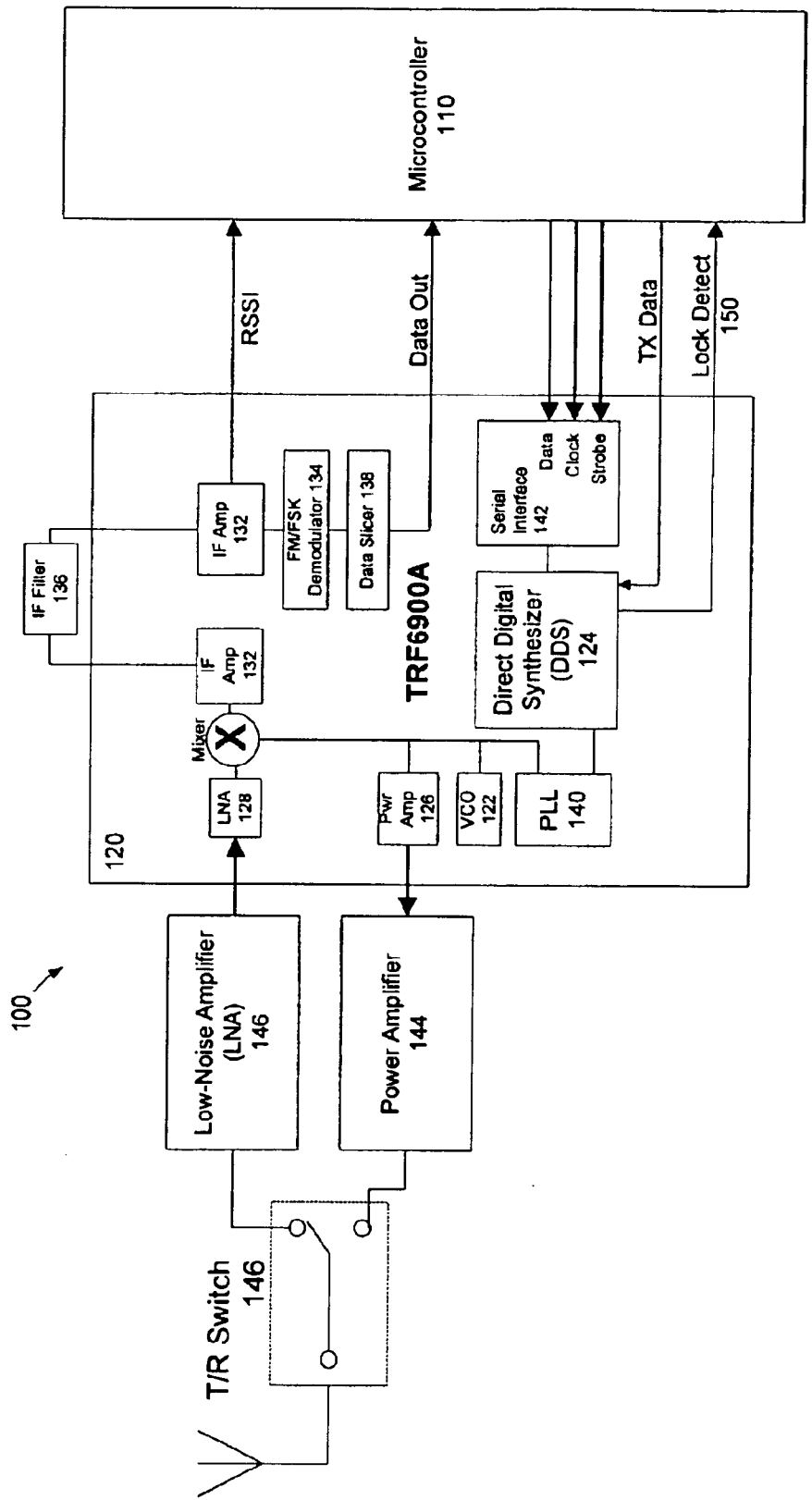
FIG. 1 illustrates an overview of an exemplary embodiment of a frequency hopping radio in accordance with the present invention.

Referring now to FIG. 1, there is illustrated an exemplary embodiment of a frequency hopping radio 100 in accordance with the present invention. The present invention is controlled by a microcontroller 110 and preferably implemented using a Texas Instruments TRF6900 transceiver 120, which is an integrated circuit that includes an FSK transceiver to establish a frequency-agile, half-duplex, bi-directional RF link. The chip may be used for linear (FM) or digital (FSK) modulated applications in the North American 915-MHz ISM band.

The transmitter portion of the transceiver 120 consists of an integrated voltage controlled oscillator (VCO) 122, a complete fully programmable direct digital synthesizer 124, and a power amplifier 126. The receiver portion consists of a low-noise amplifier 128, mixer 130, IF amplifiers 132, limiter, FM/FSK demodulator 134 with an external LC tank circuit 136, and a data slicer 138.

The demodulator 134 may be used for analog (FM) and digital (FSK) frequency demodulation. The data slicer 138 preferably acts as a comparator. The data slicer 138 provides binary logic level signals, derived from the demodulated and low pass-filtered IF signal, that are able to drive external CMOS compatible inputs in the microcontroller 110. The noninverting input is directly connected to an internal reference voltage and the inverting input is driven by the output of the low-pass filter amplifier/post detection amplifier. The decision threshold of the data slicer 138 is determined by the internal reference voltage.

The direct digital synthesizer (DDS) 124 is based on the principle of generating a sine wave signal in the digital domain. The DDS 124 constructs an analog sine waveform using an N-bit adder counting up from 0 to 2 N in steps of the frequency register to generate a digital ramp waveform. Each number in the N-bit output register is used to select the corresponding sine wave value out of the sine lookup table. After the digital-to-analog conversion, a low-pass filter is preferably used to suppress unwanted spurious responses. The analog output signal can be used as a reference input signal for a phase locked loop 140. The PLL circuit 140 then multiplies the reference frequency by a predefined factor.

The microcontroller 110 uses a three-wire unidirectional serial bus (Clock, Data, Strobe) 142 is used to program the transceiver 120. The internal registers contain all user programmable variables including the DDS frequency setting registers as well as all control registers. At each rising edge of the Clock signal, the logic value on the Data terminal is written into a 24-bit shift register. Setting the Strobe terminal high loads the programmed information into the selected latch.

The microcontroller 110 controls the transceiver 120 and controls the transmission and reception of data. The microcontroller 110 also controls which channel the radio 100 listens to, or transmits on, by setting registers in the DDS 124. The DDS 124 registers, in turn, control the phase locked loop 140 and the VCO 122 to set the transmit and receive frequencies. Those skilled in the art will recognize that this is one of several possible methods for setting the transmit and receive frequencies.

In transmit mode, the transceiver 120 has a transmit output power of 0 dBm. An external Power Amplifier (PA) 144 provides an additional 24 dB of gain, resulting in a total output power of +24 dBm. The microcontroller 110 drives a Transmit/Receiver switch 146, which advantageously allows one antenna to be used for both the transmitter and receiver portions of the transceiver 120.

In receive mode, an external low noise amplifier (LNA) 148 and the internal LNA 128 are used to amplify the received signal. The received signal is "mixed down" by the mixer 123 for processing and then amplified. The signal strength is an output and is monitored by the microcontroller 110. The receiver then converts from a frequency-modulated signal to baseband signal using the demodulator 134 and the data slicer 138. The microcontroller 110 is responsible for decoding the raw baseband signal, synchronizing to bit edges.

As will be described in greater detail below, in receive mode, the microcontroller 110 uses the Serial Interface 142 to set the receive frequency and then looks for a valid preamble from a remote transmitting device. If a valid preamble is not detected, the microcontroller 110 uses the Serial Interface 142 to change the frequency to the next preamble channel. If no preamble is detected, the microcontroller "hops" channels every 1 ms. Other hop timing may be used. When a valid preamble is detected, the receiving device can synchronize with the transmitter to receive a packet of information, as detailed below. Synchronization involves hopping in synch with the transmitter to additional preamble and data channels.

A Lock Detect signal 150 from the transceiver 120 indicates that the radio 100 is locked on the desired receive frequency. After writing the Serial Interface 142, which instructs the radio 100 to change the receiver channel, the microcontroller 110 waits for Lock Detect 150 to be asserted, signaling the receive channel can be monitored for a stable received signal. This settling time, in addition to the time required to write the registers via the Serial Interface 142, determines the per channel scan time (e.g., 1 ms).

An exemplary embodiment implemented using the radio 100 will now be explained. In this embodiment, one frequency (channel) is used for a preamble and eight frequencies (channels) for sending data. In order to meet the FCC requirements of utilizing 25 channels, this embodiment sends packets of information using three sets of one preamble channel and eight data channels, for a total of 27 channels.

Transmitters in the present embodiment output messages on three sets of nine frequencies in succession. The transmissions may have a variable time between communications; however, each successive transmission is on a new set of nine frequencies such that the total energy is spread over the complete ISM band over time.

In this embodiment, a remote receiver does not know where to look for the preamble/data messages at any point in time. Therefore, the preamble must be sent from the transmitter for a period of time sufficient for the receiver to investigate the three possible preamble channels. The end of the preamble is marked with a unique stop character. The stop character indicates that the preamble is complete and differentiates the preamble from random data. In accordance with the present invention, three different sets of preambles are used to indicate the three different message types. After the receiver locates the preamble, bit timing is developed and the hop frequency that will follow the preamble is determined. It is noted that each successive hop in the data message is pre-determined.

The present invention provides a mechanism by which each data byte may be transmitted multiple times over different data channels depending on a predetermined level of redundancy. This advantageously provides a processing gain in that if one channel is blocked by an interfering transmitter (i.e., a cordless phone or other), the packet can be successfully received. FIG. 2 illustrates such a mechanism for a data payload of 72 bytes with three levels of redundancy. An exemplary system for transmitting the data over seven data channels and five data channels is shown, however, other numbers of channels may be used to achieve a required level of redundancy (e.g., 3 or other level of redundancy). In FIG. 2, for each data channel, the first column indicates the first byte transmitted on the channel and second column indicates the last byte transmitted on that channel. The second row associated for a particular channel is for cases the where the bytes wrap around from the last channel to the first channel. For example, for the exemplary system having 5 data channels, data bytes 45–72 and 1–16 are transmitted over data channel 2. Note also that some data bytes are sent four times to make sure that all data bytes are sent the preferred three times. Thus, in accordance with this aspect of the invention, some data channels could be missed and/or corrupted and all of the data can be received on the other data channels.

In accordance with this next embodiment, two preamble channels and five or seven data channels are utilized. In this embodiment, both the preamble and the data are redundant in every packet. Because there are two preambles per packet and three different sets of two preambles and five or seven data channels, the transmitted preamble should be long enough for all receivers to scan all possible preamble channels before the preamble transmission is complete. As in the previous embodiment, once the preamble is received on a preamble channel, the receiver will be able to perform a timing lock and follow the hop channels. The transmitters output the messages on the three sets of nine frequencies in succession to equally distribute energy over the band.

The redundant preamble in this embodiment adds robustness to the transmitted packet because if a device cannot receive a preamble, it cannot receive the following data packet. Using redundant preamble channels in accordance with the present invention increases the probability of a receiver hearing a preamble. If the receiving device hears a preamble on the first preamble channel, it switches to preamble channel two in synchronization with the transmitter and listens for the second preamble. If a preamble is received on preamble channel two, the receiver detects the stop character and steps in synchronization with the transmitter to the first data channel. However, if preamble two is not heard, the receiver will still be in time synchronization with the transmitter and able to step in synchronization with the transmitter to each successive data channel.

In the same manner, if the receiver misses preamble one, but hears preamble two, the receiver will know the first data channel is next in sequence and steps to this channel in synchronization with the transmitter. The predefined sequence of channels defines whether the preamble is to be followed by another preamble channel or the first data channel.

One of the uses of the radio 100 of the present invention is in utility meter reading. The reading of electrical energy, water flow and gas usage has historically been accomplished by human meter readers that come on-site and manually document the readings. Over time this manual methodology has been enhanced with walk-by or drive-by reading systems that utilize radio communications to and from a vehicle. As a further enhancement, fixed radio systems have been used that allow data to flow from meters to host computers without human intervention. The present invention is an enhancement over conventional systems by providing a low-cost, two-way, high reliability radio for use in metering equipment.

Various modifications of the invention, in addition to those described herein, will be apparent to those of skill in the art in view of the foregoing description. Such modifications are also intended to fall within the scope of the appended claims. For example, different numbers of redundant preamble/data channels may be used such that power is distributed over the band. Also, different amounts of payload data may be sent using the redundant preamble/data channels of the present invention.

What is claimed:

1. A method of communicating a data message via a transceiver using spread spectrum communications, each byte of the data message being communicated at least a predetermined number of times over a sequence of data channels by a transmitter, the method comprising:

transmitting a preamble over a predetermined number of preamble channels; and transmitting the data message by communicating groups of data bytes that each comprises a subset of the data message over the sequence of data channels, wherein a number of bytes that comprises each group of data bytes is determined in accordance with a number of channels in the sequence of data channels and the at least predetermined number of times each byte of the data messages is to be transmitted.

2. The method of claim 1, wherein the preamble is transmitted over the predetermined number of preamble channels for a period of time sufficient in duration such that a receiver may receive the preamble.

3. The method of claim 2, wherein the preamble is concluded with a unique stop character and wherein the preamble is utilized to develop bit timing and hop frequency.

4. The method of claim 2, further comprising investigating, at the receiver, the predetermined number of preamble channels to search for the preamble, each of the predetermined number of preamble channels being associated with a predetermined number of data channels in each sequence of data channels.

5. The method of claim 1, wherein the number of bytes that comprises each group of data bytes is such that a receiver can receive the entire data message when one of the data channels is blocked by interference.

6. The method of claim 1, wherein transmitting a preamble over the predetermined number of preamble channels further comprises transmitting a redundant preamble with said preamble in a same packet.

7. The method of claim 6, further comprising:

investigating, at the receiver, the preamble channels, one of said preamble channels being a redundant preamble channel; and upon receiving the preamble, investigating the redundant preamble channel to receive the redundant preamble.

8. The method of claim 7, wherein if the receiver does not receive the redundant preamble, the method further comprising determining a hop frequency based on the preamble to receive the data message over the sequence of data channels.

9. The method of claim 6, wherein when the receiver receives a unique stop character associated with the redundant preamble, the method further comprising determining a hop frequency to receive the data message over the sequence of data channels.

10. The method of claim 6, wherein the preamble and redundant preamble are transmitted over the predetermined number of preamble channels for a period of time sufficient in duration such that a receiver may receive the preamble and redundant preamble.

11. The method of claim 10, further comprising, investigating, at the receiver, the predetermined number of preamble channels to search for the preamble and the redundant preamble, each of the predetermined number of preamble channels being associated with a predetermined number of data channels in each sequence of data channels.

12. The method of claim 1, wherein the data message comprise utility metering information, and wherein the transceiver resides in utility metering equipment.

13. A transceiver for use in a frequency hopping spread spectrum communication system, comprising:

a microcontroller;

a transmitter comprising a voltage controlled frequency generator and a power amplifier;

a receiver comprising an amplifier, a mixer, an IF amplifier, a demodulator, and a data slicer, wherein when the transceiver is transmitting, the transmitter communicates a preamble over a predetermined number of preamble channels, and thereafter communicates groups of data bytes that each comprises a subset of a data message over a predetermined sequence of data channels, wherein when the transceiver is receiving, the receiver investigates the predetermined number of preamble channels to search for the preamble, each of the predetermined number of preamble channels being associated with a predetermined number of data channels in each sequence of data channels, and wherein a number of bytes that comprises each group of data bytes is determined in accordance with a number of channels in the sequence of data channels and at least a predetermined number of times each byte of the data message is to be transmitted.

14. The apparatus of claim 13, wherein the number of bytes that comprises each group of data bytes is such that a receiver can receive the entire data message when one of the data channels is blocked by interference.

15. The apparatus of claim 13, wherein transmitting preamble over the preamble channels comprises transmitting a redundant preamble with said preamble in a same packet.

16. The apparatus of claim 15, wherein a receiver investigates the preamble channels, one of said preamble channels being a redundant preamble channel, and upon receiving the preamble, the receiver investigates the redundant preamble channel to receive the redundant preamble.

17. The apparatus of claim 15, wherein if the receiver does not receive the redundant preamble, the receiver determines a hop frequency based on the preamble to receive the data message over the predetermined sequence of data channels.

18. The apparatus of claim 15, wherein the preamble and the redundant preamble are transmitted over the predetermined number of preamble channels for a period of time sufficient in duration such that the receiver may receive the preamble and redundant preamble.

19. The apparatus of claim 15, wherein the receiver investigates the predetermined number of preamble channels to search for the preamble and the redundant preamble, each of the predetermined number of preamble channels being associated with a predetermined number of data channels in each sequence of data channels.

20. The apparatus of claim 13, wherein the data message comprises utility metering information, and wherein the transceiver resides in utility metering equipment.

* * * * *